E. LANTZ.
RELEASABLE BEARING.
APPLICATION FILED MAY 2, 1919.

1,327,286.

Patented Jan. 6, 1920.

Witness
Wm. McQuinn

Inventor
Eugene Lantz
By Shepherd & Campbell
Attorneys

UNITED STATES PATENT OFFICE.

EUGENE LANTZ, OF JERSEY CITY, NEW JERSEY.

RELEASABLE BEARING.

1,327,286.   Specification of Letters Patent.   Patented Jan. 6, 1920.

Original application filed March 6, 1919, Serial No. 280,938. Divided and this application filed May 2, 1919. Serial No. 294,191.

*To all whom it may concern:*

Be it known that I, EUGENE LANTZ, a citizen of the United States, residing at Jersey City, in the county of Hudson and State of New Jersey, have invented certain new and useful Improvements in Releasable Bearings, of which the following is a specification.

This invention relates to releasable bearings and it has for its object the provision of a structure adapted to firmly and securely support a very considerable weight any desired length of time and capable of thereafter being easily and quickly removed from supporting position. Devices of this nature are useful in many relations as, for example, for supporting ship-way keel cribbing or the shoring under the hulls of vessels under construction, in the repairing of under-pinning and foundations and in many other relations which will readily suggest themselves to those having use for a structure of this nature. Briefly stated, my improved releasable bearing comprises a pair of wedge shaped pieces the inclined faces of which lie in contact with each other, the upper face of one wedge lying parallel with the lower face of the other wedge and these upper and lower faces preferably lying in a substantially horizontal plane.

The inclined abutting faces of the wedges are not continuous throughout their length but, upon the contrary, each of these faces is interrupted to form an abrupt shoulder, these shoulders co-acting with transversely operating wedge shaped keys in a manner which will be presently set forth.

This application is filed as a division of my co-pending application Serial No. 280,938 filed March 6, 1919.

In the accompanying drawings in which like characters of reference designate corresponding parts.

Figure 1:
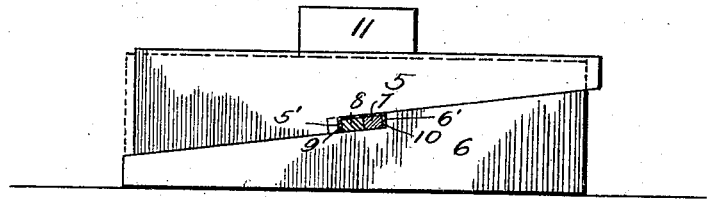
Figure 2:
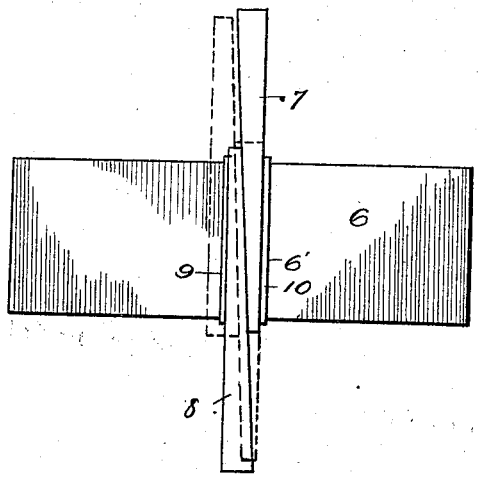

Figure 1 is a side elevation of a bearing constructed in accordance with the invention, and Fig. 2 is a plan view thereof.

Referring to the drawing 5 designates an upper wedge and 6 of a lower wedge, the abutting faces of which are stepped to form a shoulder 5′ upon the wedge 5 and a shoulder 6′ upon the wedge 6. Transversely operating wedge shaped keys 7 and 8 are adapted to operate within the space formed between the shoulders 5′ and 6′ and I preferably employ metallic bearing plates 9 and 10 which not only serve to protect the shoulders and to keep the wedges in good shape, but, since they may be smooth and polished, reduce friction at the time when the keys 7 and 8 are being driven inwardly to force the wedge 5 endwise with respect to wedge 6 to thereby lower the wedge 5 to the dotted line position illustrated in Fig. 1 and to thereby release the bearing from the support of a structure indicated by the weight 11, which may represent the keel of a ship of many tons weight.

I have found that this structure is so efficient in use that with less than six blows with a hammer the wedge 5 may be started from beneath a weight of fifty tons and my experience with this structure convinces me that it is capable of being removed from beneath a weight much greater than that named. Furthermore, I find that keys may be backed out at any time with blows from a small nail hammer even after they have been subjected to heavy blows with a twelve pound hammer.

While I have chosen to illustrate two keys 7 and 8 this structure is operable with a single key in this location, it being manifest that it would only be necessary to properly shape one of the shoulders 6′, for example, to accomplish this end.

While the elements shown and described are well adapted to serve the purpose for which they are intended it is to be understood that the invention is not limited to the precise construction set forth but that it includes within its purview whatever changes fairly come within either the terms or the spirit of the appended claims.

Having described my invention what I claim is—

1. A releasable bearing comprising a pair of wedges the inclined faces of which lie in contact with each other, each being stepped to form a shoulder, the shoulder of the upper wedge extending downwardly and the shoulder of the lower wedge extending upwardly and a laterally acting wedge shaped key lying between and co-acting with said shoulders, the shoulder of the upper wedge lying at that side of the key toward the thicker end of the wedge, and the shoulder of the lower wedge lying at the opposite side of said key.

2. A releasable bearing comprising a pair of wedges the inclined faces of which lie in contact with each other, each being stepped to form a shoulder the shoulder of the upper wedge extending downwardly and the shoulder of the lower wedge extending upwardly and a plurality of laterally disposed wedge shaped keys which co-act with each other and with said shoulders.

3. A structure as recited in claim 2 in combination with bearing plates disposed between said shoulders and said keys.

In testimony whereof I affix my signature.

EUGENE LANTZ.